No. 735,886. PATENTED AUG. 11, 1903.
S. P. KIMBALL.
CULTIVATOR.
APPLICATION FILED FEB. 13, 1903.
NO MODEL.

Witnesses
E. F. Stewart
C. N. Woodward

S. P. Kimball, Inventor.
by C. A. Snow & Co.
Attorneys

No. 735,886. Patented August 11, 1903.

UNITED STATES PATENT OFFICE.

SAMUEL P. KIMBALL, OF SALEM, OREGON.

CULTIVATOR.

SPECIFICATION forming part of Letters Patent No. 735,886, dated August 11, 1903.

Application filed February 13, 1903. Serial No. 143,260. (No model.)

*To all whom it may concern:*

Be it known that I, SAMUEL P. KIMBALL, a citizen of the United States, residing at Salem, in the county of Marion and State of Oregon, have invented a new and useful Cultivator, of which the following is a specification.

This invention relates to cultivators, more particularly to the class employed in orchards and similar contracted and tortuous localities, and has for its object to produce a simply-constructed and easily-operated implement of this character which may be very cheaply manufactured and operated with a relatively small expenditure of power and which may be employed in the vicinity of trees and other fragile vegetation without danger of injury thereto.

The invention consists in certain novel features of construction, as hereinafter shown and described, and specified in the claims.

Figure 1:
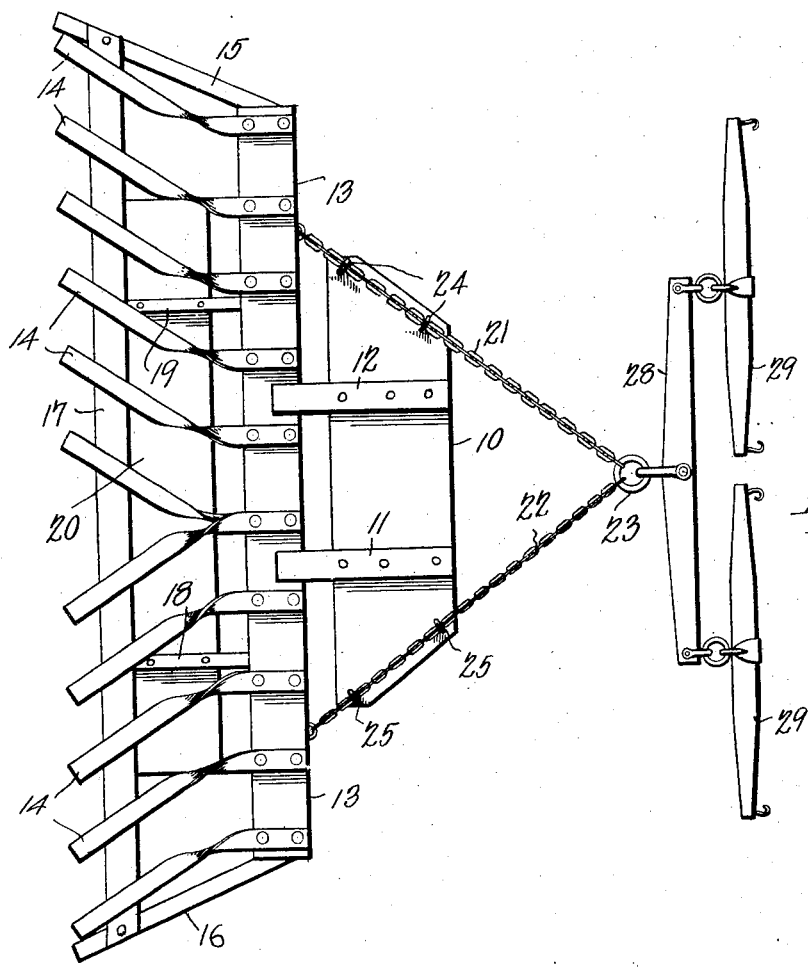
Figure 2:
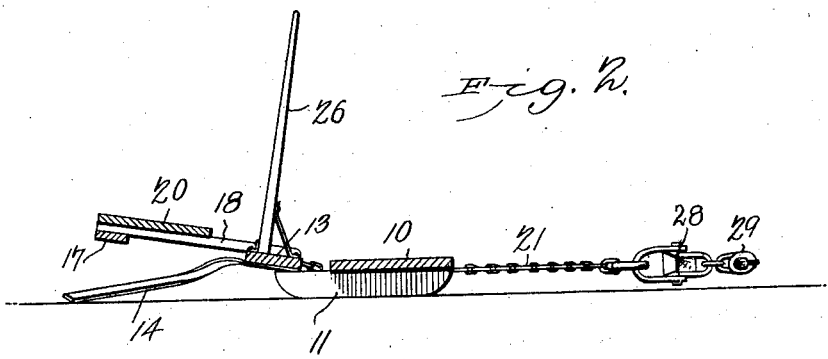

In the drawings illustrative of the invention, in which corresponding parts are denoted by like designating characters, Figure 1 is a bottom plan view of the device complete. Fig. 2 is a longitudinal sectional elevation.

The improved device consists of a platform 10, having shoes or runners 11 12, extending beyond the rear edge of the platform, as shown. Supported movably upon the extensions of the runners is a cultivator-frame consisting of a base-plate 13, from which the cultivator-teeth 14 extend at reversely-inclined angles, as shown, the teeth being preferably formed of spring-plates twisted a part of a revolution and bent in opposite directions at both vertical and lateral angles to the base-plate. By this arrangement the teeth are equally divided upon each side of the center, so that the "draft" will be equal when the resistance is equal.

The cultivator-blades will be spaced apart and so disposed that their operative portions will overlap, as indicated in Fig. 1, so that no gaps will occur when the device is in operation.

Extending rearwardly from the ends of the base-plate 13 are fender-bars 15 16, the fender-bars projecting beyond the outermost cultivator-teeth 14 and preventing the teeth from coming in contact with trees or other objects. The rear ends of the fender-bars are connected by a longitudinal bar 17, and between this rear bar and the plate 13 are other bars 18 19 and providing supporting means for the driver's stand 20, as shown. The driver's stand and fender-bars and supporting-frame thus stand at an angle relative to the teeth 14 and platform 10, as indicated in Fig. 2.

Connected to the forward edge of the base-plate 13 are draft-chains 21 22, extending forwardly and terminating in a ring 23, which unites the two chains. The chains pass beneath the platform 10 and are connected thereto, as indicated at 24 25, the chains thus serving the double purpose of draft means to the platform and cultivator-frame and likewise as a flexible coupling between the platform and cultivator-frame. The draft-team will be connected to the chains 21 22 in any suitable manner, as by the usual doubletrees 28 and swingletrees 29 when two horses are employed or by a swingletree only when one horse is employed.

Extending upwardly from the base-plate 13 is an operating lever-arm 26, convenient to the hand of the operator upon the "stand" 20 and suitably braced from the plate to secure the necessary rigidity.

When thus constructed, the operation is as follows: The driver takes his place centrally upon the stand 20 to add his weight to the device, and by moving from side to side he can easily regulate the draft and cause the device to be deflected to either side or increase or decrease the depth of the cut of the teeth by changing his position nearer to or farther from the platform 10, as will be obvious. If the cultivator-teeth become clogged or if for any other reason it is desirable to elevate the teeth free from the ground, the driver steps to the platform 10 and draws the lever-arm 26 forward, which will tilt the cultivator-frame and raise the teeth free from the ground and free them from obstructions.

The device is thus very simple and easy to operate, speedy, and effective in action, leaving the ground smooth and uniformly pulverized and free from weeds and other objectionable growth.

The device can be manufactured in any desired size and is capable of employment wherever implements of this character are usually required, but, as before stated, is more particularly applicable for use in orchards and similar contracted and tortuous localities, wherein the fender-bars perform an important function in preventing injury to trees or other vegetation and likewise protecting the cultivator-teeth from injury from objects which they might otherwise strike.

Having thus described the invention, what I claim is—

1. A cultivator consisting of a platform adapted to be drawn over the ground, a frame having cultivator-teeth and movably connected to said platform, and fenders extending from said frame beyond the cultivator-teeth, substantially as described.

2. A cultivator comprising a platform having runners and adapted to be drawn over the ground, a frame having cultivator-teeth, a platform supported upon said frame above said cultivator-teeth, a link connection between the front platform and the rear frame, and a lever-handle extending upwardly from the latter.

3. In an implement of the class described, the combination of a front platform mounted upon runners, a frame resting upon the rear ends of said runners and having cultivator-teeth engaging the ground, a link connection between the front platform and the frame, and a platform supported by the latter above the teeth.

In testimony that I claim the foregoing as my own I have hereto affixed my signature in the presence of two witnesses.

SAMUEL P. KIMBALL.

Witnesses:
W. T. RAMSDEN,
JOHN A. JEFFREY.